US009794541B2

(12) United States Patent
Gay et al.

(10) Patent No.: US 9,794,541 B2
(45) Date of Patent: *Oct. 17, 2017

(54) VIDEO CAPTURE SYSTEM CONTROL USING VIRTUAL CAMERAS FOR AUGMENTED REALITY

(71) Applicant: Disney Enterprises, Inc., Burbank, CA (US)

(72) Inventors: Michael Gay, Collinsville, CT (US); Aaron Thiel, Durham, CT (US)

(73) Assignee: Disney Enterprises, Inc., Burbank, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/307,356

(22) Filed: Jun. 17, 2014

(65) Prior Publication Data

US 2014/0293014 A1  Oct. 2, 2014

Related U.S. Application Data

(63) Continuation of application No. 12/655,669, filed on Jan. 4, 2010, now Pat. No. 8,803,951.

(51) Int. Cl.
*G06T 19/00* (2011.01)
*H04N 13/00* (2006.01)
*H04N 13/02* (2006.01)

(52) U.S. Cl.
CPC ......... *H04N 13/004* (2013.01); *G06T 19/006* (2013.01); *H04N 13/0239* (2013.01)

(58) Field of Classification Search
None
See application file for complete search history.

(56) References Cited

U.S. PATENT DOCUMENTS

| 7,636,087 | B2 * | 12/2009 | Takahashi | G06T 13/20 345/418 |
| 8,014,985 | B2 * | 9/2011 | Clavadetscher | G06T 15/20 703/6 |
| 2004/0219980 | A1 * | 11/2004 | Bassett | A63F 13/10 463/33 |
| 2006/0132482 | A1 * | 6/2006 | Oh | G06T 13/80 345/419 |
| 2006/0152434 | A1 * | 7/2006 | Sauer | G02B 27/0101 345/8 |
| 2006/0211463 | A1 * | 9/2006 | Nishiyama | A63F 13/08 463/1 |

(Continued)

*Primary Examiner* — Kate Luo
(74) *Attorney, Agent, or Firm* — Farjami & Farjami LLP

(57) ABSTRACT

There is provided a system and method for integrating a virtual rendering system and a video capture system using flexible camera control to provide an augmented reality. There is provided a method for integrating a virtual rendering system and a video capture system for outputting a composite render to a display, the method comprising obtaining, from the virtual rendering system, a virtual camera configuration of a virtual camera in a virtual environment, programming the video capture system using the virtual camera configuration to correspondingly control a robotic camera in a real environment, capturing a video capture feed using the robotic camera, obtaining a virtually rendered feed using the virtual camera, rendering the composite render by processing the feeds, and outputting the composite render to the display.

19 Claims, 4 Drawing Sheets

(56) References Cited

U.S. PATENT DOCUMENTS

| | | | |
|---|---|---|---|
| 2006/0221179 A1* | 10/2006 | Seo | H04N 13/0235 348/46 |
| 2007/0238981 A1* | 10/2007 | Zhu | A61B 90/36 600/424 |
| 2007/0282564 A1* | 12/2007 | Sprague | G03B 21/14 702/141 |
| 2007/0296721 A1* | 12/2007 | Chang | G06T 15/10 345/427 |
| 2008/0192116 A1* | 8/2008 | Tamir | G06T 7/2093 348/157 |
| 2008/0263460 A1* | 10/2008 | Altberg | G06Q 30/02 715/757 |
| 2008/0267450 A1* | 10/2008 | Sugimoto | A63H 17/395 382/103 |
| 2008/0280676 A1* | 11/2008 | Distanik | G07F 17/32 463/29 |
| 2009/0005140 A1* | 1/2009 | Rose | A63F 13/00 463/7 |
| 2009/0070093 A1* | 3/2009 | Nakanishi | A63F 13/00 703/22 |
| 2009/0170600 A1* | 7/2009 | Komatsumoto | A63F 13/10 463/32 |
| 2009/0247250 A1* | 10/2009 | Kato | A63F 13/10 463/2 |
| 2009/0271715 A1* | 10/2009 | Tumuluri | G06F 19/3437 715/757 |

* cited by examiner

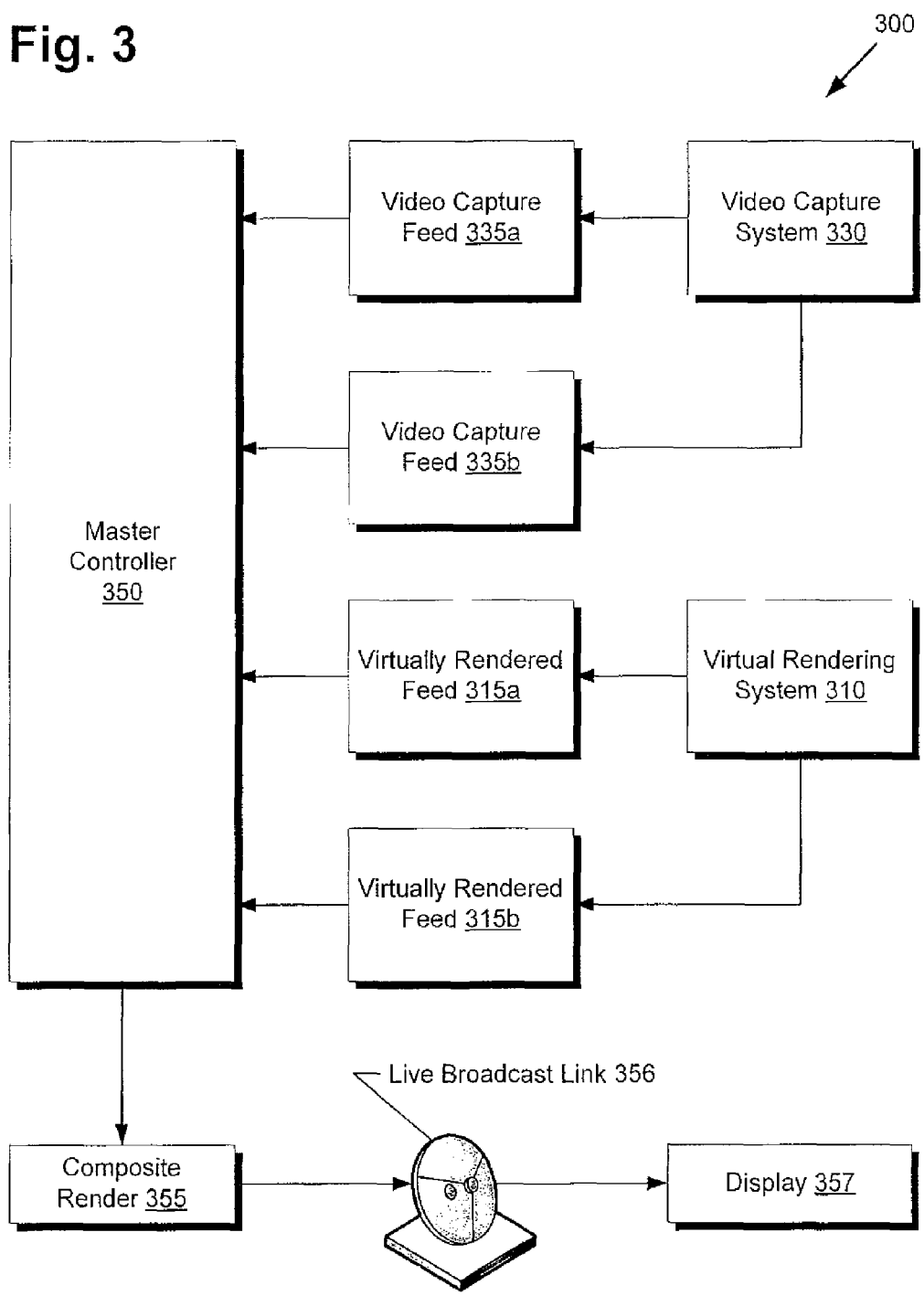

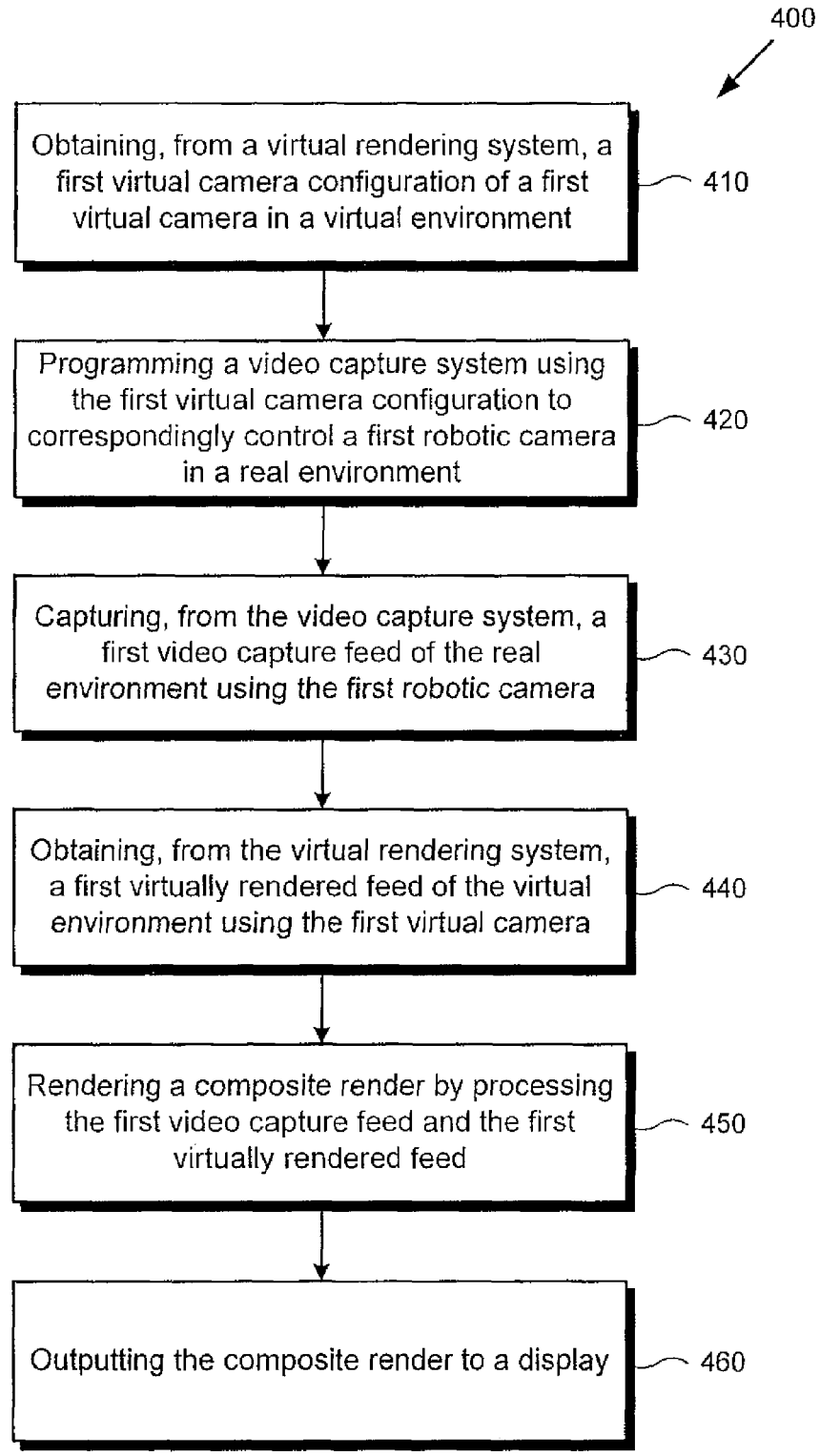

VIDEO CAPTURE SYSTEM CONTROL USING VIRTUAL CAMERAS FOR AUGMENTED REALITY

BACKGROUND OF THE INVENTION

1. Field of the Invention

The present invention relates generally to digital video. More particularly, the present invention relates to digital video rendering.

2. Background Art

Modern commodity PC hardware and videogame consoles are often equipped with sufficient processing capability to enable high-resolution real-time three-dimensional graphics rendering. Even portable devices such as mobile phones and handheld gaming systems are often equipped with scaled down real-time three-dimensional graphics support. Such low-cost commodity graphics processing hardware has enabled a wide variety of entertainment and productivity applications to support enhanced visual presentations for greater user engagement and enjoyment.

In particular, real-time three-dimensional graphics rendering has found itself as a highly supportive role in live broadcast programming. For example, coverage of sports and other live events can be readily enhanced with composite renderings using three-dimensional graphics for alternative or substitute object rendering, strategy simulations, information boxes, alternative viewpoints, and other effects. Although three-dimensional analysis tools that allow for real-time modification of live footage exist, they are limited to modifying existing video camera footage using prior camera paths and viewpoints. As a result, viewer engagement is low since the scope of analysis is so limited.

Accordingly, there is a need to overcome the drawbacks and deficiencies in the art by providing a way to create composite renderings using live footage with real-time three-dimensional graphics rendering for high viewer impact and engagement.

SUMMARY OF THE INVENTION

There are provided systems and methods for integrating a virtual rendering system and a video capture system using flexible camera control to provide an augmented reality, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a diagram of a composite render being generated, according to one embodiment of the present invention; and FIG. 4 shows a flowchart describing the steps, according to one embodiment of the present invention, by a virtual rendering system and a video capture system may be integrated for outputting a composite render of an augmented reality to a display.

DETAILED DESCRIPTION OF THE INVENTION

The present application is directed to a system and method for integrating a virtual rendering system and a video capture system using flexible camera control to provide an augmented reality. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
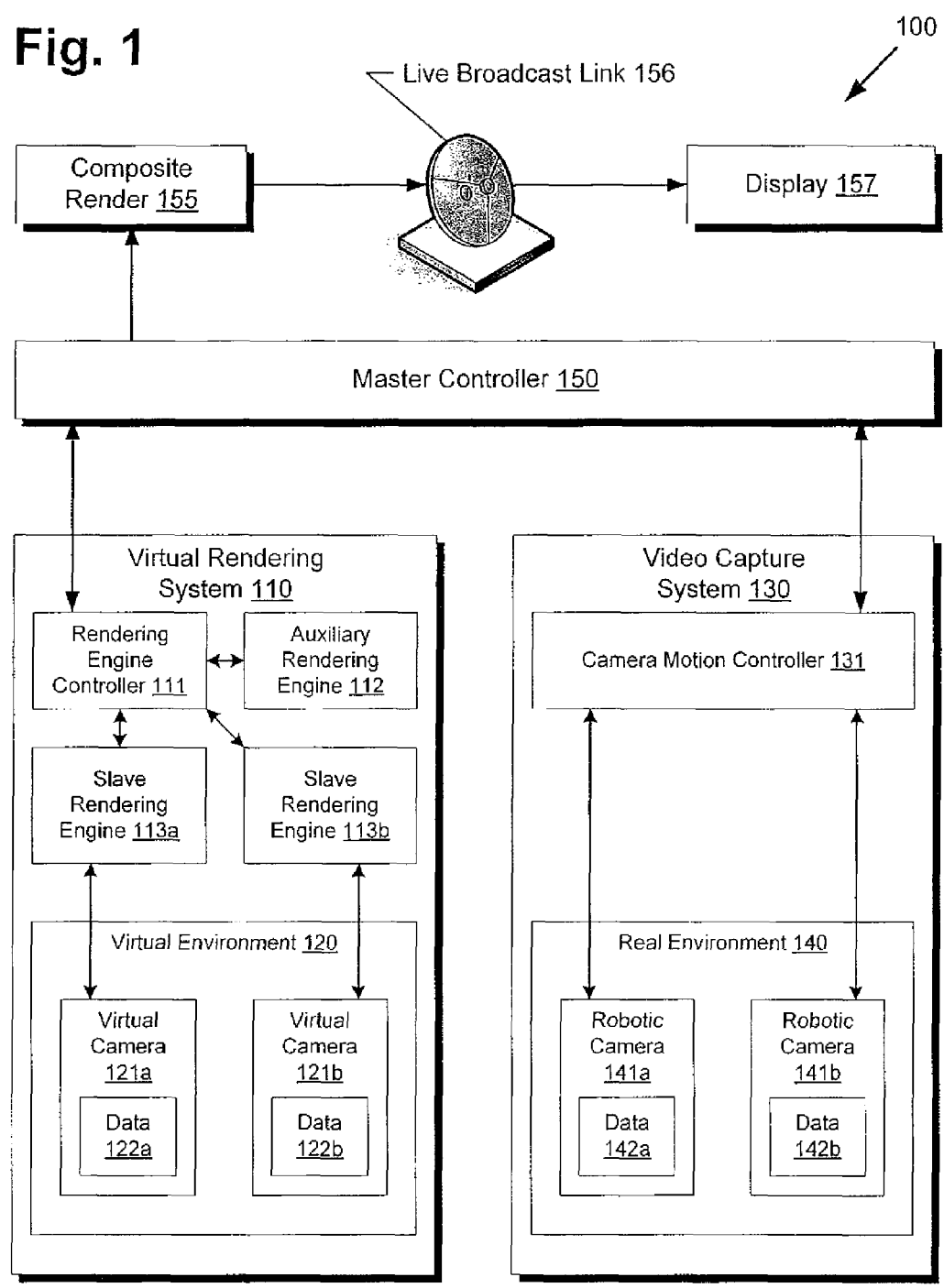
FIG. 1 presents a system for integrating a virtual rendering system and a video capture system using flexible camera control to provide an augmented reality, according to one embodiment of the present invention.

FIG. 1 presents a system for integrating a virtual rendering system and a video capture system using flexible camera control to provide an augmented reality, according to one embodiment of the present invention. Diagram 100 of FIG. 1 includes virtual rendering system 110, video capture system 130, master controller 150, composite render 155, live broadcast link 156, and display 157. Virtual rendering system 110 includes rendering engine controller 111, auxiliary rendering engine 112, slave rendering engines 113a-113b, and virtual environment 120. Virtual environment 120 includes virtual cameras 121a-121b. Virtual camera 121a includes data 122a. Virtual camera 121b includes data 122b. Video capture system 130 includes camera motion controller 131 and real environment 140. Real environment 140 includes robotic cameras 141a-141b. Robotic camera 141a includes data 142a. Robotic camera 141b includes data 142b.

Rendering engine controller 111, auxiliary rendering engine 112, slave rendering engine 113a, and slave rendering engine 113b may each execute on several separate servers, each comprising standard commodity PC hardware or a videogame console system. Alternatively, the engines of virtual rendering system 110 may be consolidated into a single server, or distributed remotely across a network to minimize the amount of necessary on-site hardware. Rendering engine controller 111 may coordinate control and data sharing between the different rendering subsystems, as shown in FIG. 1. Auxiliary rendering engine 112 may provide static graphics overlays and other graphical effects that do not require input from virtual environment 120. Slave rendering engines 113a-113b each control virtual cameras 121a-121b respectively to receive a virtually rendered feed of virtual environment 120.

Data 122a-122b describing the configuration of virtual cameras 121a-121b within virtual environment 120 may each include, for example, position data such as three-dimensional coordinates, camera field of view orientation data such as camera angle, focal length and focus distance, movement data such as a motion path or velocity and acceleration, and camera characteristics such as lens parameters, camera size, center of lens, and other camera modeling details. Three-dimensional coordinates between virtual environment 120 and real environment 140 may be defined using a common frame of reference, such as setting a particular corner of a field or a particular landmark as a common (0, 0, 0) coordinate. The motion path may then describe the changing of the above data parameters with respect to time, such as the three-dimensional coordinates with respect to time or the camera field of view with respect to time. Slave rendering engines 113a-113b may then modify data 122a-122b respectively to control camera paths for respective virtual cameras 121a-121b.

Although virtual rendering system 110 of FIG. 1 depicts only two slave rendering engines each controlling exactly one virtual camera, alternative embodiments may use any arbitrary number of slave rendering engines to control any arbitrary number of virtual cameras. More specifically, each slave rendering engine may control more than one virtual camera. Similarly, although video capture system 130 of FIG. 1 only depicts two robotic cameras, alternative embodiments may use any arbitrary number of robotic cameras to be controlled by camera motion controller 131 of video capture system 130. In this manner, the composite rendering system shown in FIG. 1 can be scaled to as many camera angles and viewpoints as desired, in either virtual environment 120 or real environment 140.

Real environment 140 corresponds to an actual physical environment represented by virtual environment 120. For example, real environment 140 might comprise an indoor or outdoor sports field or stadium, a golf course, a natural environment, an urban environment, or any other locale. Although examples have so far focused on sports entertainment applications, other focuses such as educational or informational applications may also benefit from this use of augmented reality. Virtual environment 120 may then be created using manual three-dimensional environmental modeling, automated photographic or video extrapolation, or some other manual or automated method.

Master controller 150 may direct virtual rendering system 110 to control virtual cameras 121a-121b according to particular parameters, and also direct video capture system 130 to control robotic cameras 141a-141b using the same parameters. The particular parameters of camera behavior might be dictated by manual control, by tracking the motion of a particular object or focusing on a particular scene in either virtual environment 120 or real environment 140, by replaying a previously recorded pattern of movement or another predetermined path, or by using some other criteria. Tracked objects may include, for example, a ball or a participating player of a game such as a sports match, and may be virtual or real. Once the virtual and robotic cameras are properly configured by appropriately programming the motion paths of data 122a-122b and 142a-142b, master controller 150 may then query virtual rendering system 110 for virtually rendered feeds and video capture system 130 for video capture feeds. Master controller 150 may then act as a rendering controller by combining the feeds smoothly using standard broadcast key technology such as chroma key or key/fill to generate composite render 155, which includes real and virtual feed elements arranged in a specific desired manner for broadcast over live broadcast link 156 to display 157. Live broadcast link 156 may comprise, for example, a satellite uplink to a television studio, from where the broadcasted material is disseminated to the general public. Display 157 may then represent, for example, a television of a viewer watching the broadcast.

Figure 2:
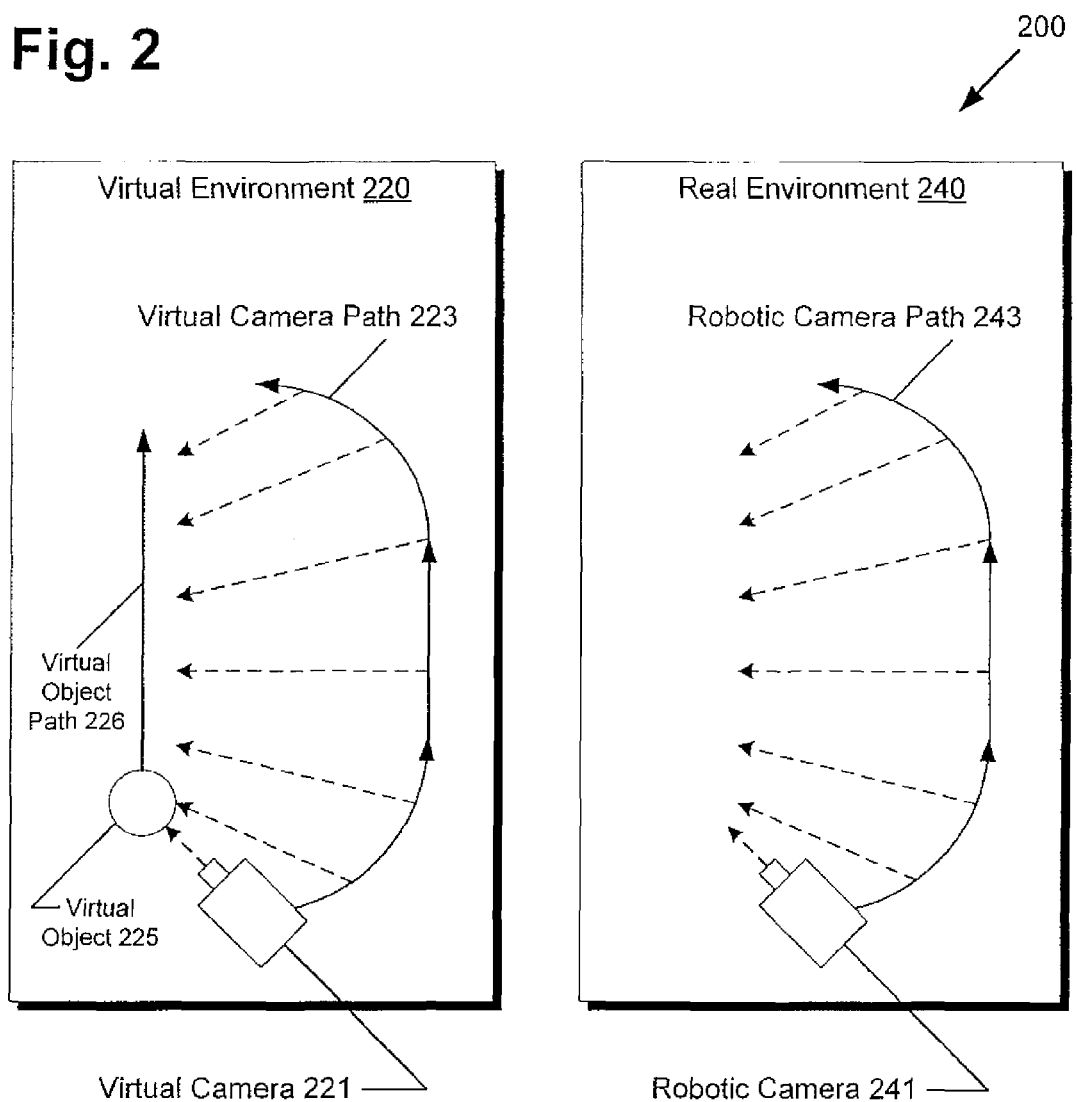
FIG. 2 presents a diagram of a robotic camera path configured to match a virtual camera path, according to one embodiment of the present invention.

FIG. 2 presents a diagram of a robotic camera path configured to match a virtual camera path, according to one embodiment of the present invention. Diagram 200 of FIG. 2 includes virtual environment 220 and real environment 240. Virtual environment 220 includes virtual camera 221, virtual camera path 223, virtual object 225, and virtual object path 226. Real environment 240 includes robotic camera 241 and robotic camera path 243. With regards to FIG. 2, it should be noted that virtual environment 220 corresponds to virtual environment 120 from FIG. 1 and that real environment 240 corresponds to real environment 140 from FIG. 1. Moreover, although FIG. 2 only depicts a single virtual camera and a single robotic camera for simplicity, alternative embodiments may use multiple virtual cameras and multiple robotic cameras.

As previously discussed in FIG. 1, master controller 150 may direct video capture system 130 to control robotic cameras similarly to virtual cameras in virtual rendering system 110. FIG. 2 shows an example of this manner of control, where robotic camera 241 is programmed to follow the movements of virtual camera 221. For example, virtual camera 221 may be programmed to focus on the movement of virtual object 225 following virtual object path 226. Thus, virtual camera 221 may follow virtual camera path 223, with camera orientation following virtual object path 226 as indicated by the dotted arrows. Virtual camera path 223 may then be recorded and programmed into robotic camera 241 of real environment 240, so that robotic camera 241 can follow robotic camera path 243 mirroring virtual camera path 223. Robotic camera 241 may comprise, for example, a gantry supported fly-by camera, a programmable motion control camera, or another camera system supporting programmable movement.

As shown in FIG. 2, the camera orientation of robotic camera 241 moves as if it were following virtual object path 226 within real environment 240, even though there is no corresponding real object for virtual object 225 in real environment 240. By using the system described above in FIG. 1, robotic camera 241 can thus be synchronized to the camera movements of virtual camera 221. Composite rendering of real and virtual environments, also known as "augmented reality", is thus facilitated, as the camera views in virtual environment 220 and real environment 240 can be matched according to any desired virtual camera path, opening up limitless possibilities for dynamic camerawork.

The example shown in FIG. 2 might be used, for example, to present a dynamic panning camera view showing a hypothetical ball pass defined by virtual object 225 following virtual object path 226, even though such a ball pass never happened in real environment 240. Thus, a composite render might show a real sports field background and real players in a video feed captured from real environment 240, but with a virtual ball rendered in virtual environment 220 as defined by virtual object 225 following virtual object path 226. Thus, the composite render can provide a realistic camera fly-by with background elements from real environment 240 and a virtual ball rendered from virtual environment 220. This may be used, for example, to present hypothetical plays and strategy analysis in a realistic and engaging manner for high viewer impact.

FIG. 3 presents a diagram of a composite render being generated, according to one embodiment of the present invention. Diagram 300 of FIG. 3 includes virtual rendering system 310, virtually rendered feeds 315a-315b, video capture system 330, video capture feeds 335a-335b, master controller 350, composite render 355, live broadcast link 356, and display 357. With regards to FIG. 3, it should be noted that virtual rendering system 310 corresponds to virtual rendering system 110 from FIG. 1, that video capture system 330 corresponds to video capture system 130, that master controller 350 corresponds to master controller 150, that composite render 355 corresponds to composite render 155, that live broadcast link 356 corresponds to live broadcast link 156, and that display 357 corresponds to display 157.

As shown in FIG. 3, virtual rendering system 310 provides master controller 350 with virtually rendered feeds 315a-315b, while video capture system 330 provides master controller 350 with video capture feeds 335a-335b. For example, video capture feed 335a might correspond to a feed generated by robotic camera 241 in FIG. 2, whereas virtually rendered feed 315a might correspond to a feed generated by virtual camera 221 in FIG. 2. Virtually rendered feed 315b may correspond to a feed created by an overhead virtual camera providing a bird's eye overview of virtual environment 220 from FIG. 2, whereas video capture feed 335b may correspond to a feed created by an overhead robotic camera providing a bird's eye overview of real environment 240 from FIG. 2.

Master controller 350 may then combine virtually rendered feed 315a and video capture feed 335a for an augmented reality fly-by scene and also combine virtually rendered feed 315b and video capture feed 335b for an augmented reality bird's eye overview scene. As previously discussed, master controller 350 may use standard broadcast key technologies to combine the different feeds smoothly so that the juxtaposition of real and virtual elements is visually unobtrusive. Master controller 350 may then use these combined scenes in composite render 355 through various presentation methods such as split screen, cascaded or tiled frames, "picture-in-picture", three-dimensional surfaces, and other formatted layouts. Master controller 350 may then forward composite render 355 over live broadcast link 356 for showing on display 357. Master controller 350 may repeat the above process of generating composite render 355 in a periodic manner, such as 24, 30, or 60 times per second or higher in order to accommodate a desired video broadcasting framerate.

Although FIG. 3 only shows a single composite render 355, alternative embodiments may use several composite renders. For example, master controller 350 may generate multiple composite renders to provide different camera views for multiple broadcast channels, to customize based on a target broadcast region or audience demographics, to focus on a particular team in a sports match, or to support any other broadcasting application that may require multiple concurrent video streams. By adding additional slave rendering engines and robotic cameras, augmented reality rendering systems can be readily scaled and configured to support large-scale projects.

FIG. 4 shows a flowchart describing the steps, according to one embodiment of the present invention, by a virtual rendering system and a video capture system may be integrated for outputting a composite render of an augmented reality to a display. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises obtaining, from virtual rendering system 110, data 122a of virtual camera 121a in virtual environment 120. As shown in FIG. 1, master controller 150 may query rendering engine controller 111 for a virtual camera configuration concerning virtual camera 121a. Rendering engine controller 111 may then determine that slave rendering engine 113a controls virtual camera 121a, and correspondingly send a request to slave rendering engine 113a to retrieve data 122a. Data 122a may then be retrieved by slave rendering engine 113a, for relay back to master controller 150 via rendering engine controller 111. As previously described, data 122a may contain various information concerning the configuration of virtual camera 121a such as three-dimensional position and movement, camera focus and view, camera model parameters, and other details.

Referring to step 420 of flowchart 400 in FIG. 4 and diagram 100 of FIG. 1, step 420 of flowchart 400 comprises programming video capture system 130 using data 122a obtained from step 410 to correspondingly control robotic camera 141a in real environment 140. For example, master controller 150 may instruct camera motion controller 131 to program values into data 142a to match data 122a as closely as possible. As previously discussed, data 122a may include three-dimensional coordinates and camera field of view with respect to time. Assuming virtual camera 221 and robotic camera 241 correspond to virtual camera 121a and robotic camera 141a, the result of setting data 142a to match data 122a may be manifested by robotic camera path 243 mimicking virtual camera path 223, as shown in FIG. 2.

Referring to step 430 of flowchart 400 in FIG. 4, diagram 200 of FIG. 2, and diagram 300 of FIG. 3, step 430 of flowchart 400 comprises capturing, from video capture system 330, video capture feed 335a of real environment 240 using robotic camera 241. Since the motion path of robotic camera 241 was previously programmed in step 420, step 430 results in master controller 350 receiving video capture feed 335a comprising fly-by footage according to robotic camera path 243.

Referring to step 440 of flowchart 400 in FIG. 4, diagram 200 of FIG. 2, and diagram 300 of FIG. 3, step 440 of flowchart 400 comprises obtaining, from virtual rendering system 310, virtually rendered feed 315a of virtual environment 220 using virtual camera 221. As previously discussed, virtual camera path 223 may be defined in any number of ways, such as by manual control, object tracking, recorded motion replay, or predetermined paths. As shown in FIG. 2, virtual camera path 223 is defined as an arc with the camera field of view following virtual object 225 as it progresses through virtual object path 226. Thus, master controller 350 may receive virtually rendered feed 315a comprising fly-by footage according to virtual camera path 223, wherein the feed includes a rendering of virtual object 225.

Referring to step 450 of flowchart 400 in FIG. 4 and diagram 300 of FIG. 3, step 450 of flowchart 400 comprises rendering composite render 355 by processing video capture feed 335a from step 430 and virtually rendered feed 315a from step 440. As previously discussed, master controller 350 may accomplish step 450 using standard broadcast key technology such as chroma key or key/fill techniques to isolate and combine components from each feed to produce a result with a smooth visual juxtaposition of real and virtual elements.

Referring to step 460 of flowchart 400 in FIG. 4 and diagram 300 of FIG. 3, step 460 of flowchart 400 comprises outputting composite render 355 from step 450 to display 357. As shown in FIG. 3, master controller 350 may send composite render 355 using live broadcast link 356, which might comprise a satellite uplink to a broadcast station for public dissemination. Eventually, composite render 355 shows on display 357, which might comprise the television of a viewer at home.

While the above steps 410-460 have been described with respect to a single virtual camera, a single robotic camera, and a single composite render, steps 410-460 may also be repeated as necessary to support multiple virtual cameras, multiple robotic cameras, and multiple composite renders, as previously described. In this manner, the described rendering system can be flexibly scaled to larger projects by increasing the number of slave rendering systems and robotic cameras to handle additional feeds in real-time.

In this manner, live events such as sports can be enhanced with high-impact augmented reality segments by leveraging the cost effective real-time graphical capabilities of modern commodity PC hardware and game consoles. This can provide networks with a competitive advantage by drawing in and retaining greater viewership by providing compelling augmented reality content while requiring only minor additional infrastructure outlays over standard rendering systems. Since commodity hardware parts are used and numerous effective virtual rendering systems and engines are available for licensing, expensive proprietary systems and vendor lockout may be avoided, further reducing total cost of ownership.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for integrating a virtual rendering system and a video capture system for outputting a composite render to a display, the method comprising:

tracking a moving virtual object in the virtual environment by a first virtual camera traveling on a first virtual camera path and a second virtual camera traveling on a second virtual path, wherein the first virtual camera path and the second camera path are defined by tracking a real object moving in a real environment;

obtaining a first virtually rendered feed of the virtual environment, including the moving virtual object, from the first virtual camera, and a second virtually rendered feed of the virtual environment, including the moving virtual object, from the second virtual camera:

obtaining, from the virtual rendering system, a first virtual camera position data and a first virtual camera movement data of the first virtual camera while the first virtual camera is travelling on the virtual camera path and tracking the moving virtual object in the virtual environment, and a second virtual camera position data and a second virtual camera movement data of the second virtual camera while the second virtual camera is travelling on the second virtual camera path and tracking the moving virtual object in the virtual environment;

programming the video capture system using the first virtual camera position data and the virtual camera movement data of the first virtual camera to control a first robotic camera in the real environment, and using the second virtual camera position data and the second virtual camera movement data of the second virtual camera to control a second robotic camera in the real environment to travel on a real path corresponding to the first virtual camera path and the second virtual camera path, respectively;

capturing, from the video capture system, a first video capture feed of the real environment using the first robotic camera while travelling on the real path and a second video capture feed of the real environment using the second robotic camera while travelling on the real path;

rendering the composite render by processing the first video capture feed, the first virtually rendered feed, the second video capture feed and the second virtually rendered feed, including the moving virtual object; and outputting the composite render to the display by simultaneously displaying the first virtually rendered feed and the second virtually rendered feed, wherein the first virtually rendered feed corresponds to a birdseye view of the virtual environment, and the second virtually rendered feed corresponds to a flyby view of the virtual environment.

2. The method of claim 1, wherein the first virtual camera movement data includes a first motion path of the first virtual camera in the virtual environment, and wherein the control of the first robotic camera uses the first motion path in the real environment.

3. The method of claim 2, wherein the first motion path includes a three-dimensional position with respect to time.

4. The method of claim 2, wherein the first motion path includes a camera orientation or field of view with respect to time.

5. The method of claim 2, wherein the first motion path tracks a path of the moving virtual object.

6. The method of claim 5, wherein the moving virtual object comprises a virtual player of a virtual game.

7. The method of claim 2, wherein the first motion path is based on a predetermined path.

8. The method of claim 1 further comprising:

obtaining, from the virtual rendering system, a first virtual camera field of view orientation data of the first virtual camera while tracking the moving virtual object in the virtual environment, and wherein the camera field of view orientation data includes a focal length and a focus distance of the virtual camera.

9. The method of claim 1, wherein the first virtual camera movement data includes a velocity of the first virtual camera.

10. The method of claim 1, wherein the first virtual camera movement data includes an acceleration of the first virtual camera.

11. A rendering controller for outputting a composite render to a display, the rendering device comprising:

a processor configured to:

track a moving virtual object in the virtual environment by a first virtual camera traveling on a first virtual camera path and a second virtual camera traveling on a second virtual path, wherein the first virtual camera path and the second camera path are defined by tracking a real object moving in a real environment;

obtain a first virtually rendered feed of the virtual environment and a second virtually rendered feed of the virtual environment, including the moving virtual object, from the first virtual camera and the second virtual camera, respectively;

obtain, from a virtual rendering system, a first virtual camera position data and a first virtual camera movement data of the first virtual camera while the first virtual camera is travelling on the virtual camera path and tracking the moving virtual object in the virtual environment and a second virtual camera position data and a second virtual camera movement data of the second virtual camera while the second virtual camera is travelling on the second virtual camera path and tracking the moving virtual object in the virtual environment;

program a video capture system using the first virtual camera position data and the virtual camera movement data of the first virtual camera to control a first robotic camera in the real environment to travel on a real path corresponding to the virtual camera path, and using the second virtual camera position data and the second virtual camera movement data of the second virtual camera to control a second robotic camera in the real environment to travel on a real path corresponding to the first virtual camera path and the second virtual camera path, respectively;

capture, from the video capture system, a first video capture feed of the real environment using the first robotic camera while travelling on the real path, and a second video capture feed of the real environment using the second robotic camera while travelling on the real path;

render the composite render by combining the first video capture feed, the first virtually rendered feed, the second video capture feed and the second virtually rendered feed, including the moving virtual object; and output the composite render to the display by simultaneously displaying the first virtually rendered feed and the second virtually rendered feed, wherein the first virtually rendered feed corresponds to a birdseye view of the virtual environment, and the second virtually rendered feed corresponds to a flyby view of the virtual environment.

12. The rendering controller of claim 11, wherein the first virtual camera movement data includes a first motion path of the first virtual camera in the virtual environment, and wherein the control of the first robotic camera uses the first motion path in the real environment.

13. The rendering controller of claim 12, wherein the first motion path includes a three-dimensional position with respect to time.

14. The rendering controller of claim 12, wherein the first motion path includes a camera orientation or field of view with respect to time.

15. The rendering controller of claim 12, wherein the first motion path tracks a path of the moving virtual object.

16. The rendering controller of claim 15, wherein the moving virtual object comprises a virtual player of a virtual game.

17. The rendering controller of claim 12, wherein the first motion path is based on a predetermined path.

18. The rendering controller of claim 11, wherein the processor is further configured to:

obtain, from the virtual rendering system, a first virtual camera field of view orientation data of the first virtual camera while tracking the moving virtual object in the virtual environment, and wherein the camera field of view orientation data includes a focal length and a focus distance of the virtual camera.

19. The rendering controller of claim 11, wherein the first virtual camera movement data includes a velocity and an acceleration of the first virtual camera.

* * * * *